(12) United States Patent
Weyrich et al.

(10) Patent No.: US 10,513,239 B2
(45) Date of Patent: Dec. 24, 2019

(54) GAS BAG FOR AN AIRBAG MODULE (71) Applicant: TAKATA AG, Aschaffenburg (DE)

(72) Inventors: Christian Weyrich, Oberelchingen (DE); Hans-Peter Sendelbach, Senden (DE); Volker Rathgeb, Ehingen-Risstissen (DE); Uwe Dierks, Blaubeuren (DE); Holger Rist, Neu-Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 195 days.

(21) Appl. No.: 15/577,087

(22) PCT Filed: May 27, 2016

(86) PCT No.: PCT/EP2016/062030
§ 371 (c)(1),
(2) Date: Nov. 27, 2017

(87) PCT Pub. No.: WO2016/189145
PCT Pub. Date: Dec. 1, 2016

(65) Prior Publication Data
US 2019/0023218 A1 Jan. 24, 2019

(30) Foreign Application Priority Data

May 28, 2015 (DE) .................. 10 2015 108 423

(51) Int. Cl.
*B60R 21/231* (2011.01)
*B60R 21/235* (2006.01)
(Continued)

(52) U.S. Cl.
CPC ...... *B60R 21/23138* (2013.01); *B60R 21/207* (2013.01); *B60R 21/235* (2013.01);
(Continued)

(58) Field of Classification Search
CPC ............ B60R 21/23138; B60R 21/235; B60R 21/207; B60R 2021/23146;
(Continued)

(56) References Cited

U.S. PATENT DOCUMENTS 3,991,249 A * 11/1976 Yamashita ............ B60R 21/235
428/35.5
5,178,408 A 1/1993 Barrenscheen et al.
(Continued)

FOREIGN PATENT DOCUMENTS

CN 101080340 A 11/2007
CN 101096198 A 1/2008
(Continued)

OTHER PUBLICATIONS

International Search Report dated Nov. 2, 2016 issued in PCT/EP2016/062030.
(Continued)

*Primary Examiner* — Paul N Dickson
*Assistant Examiner* — Timothy Wilhelm
(74) *Attorney, Agent, or Firm* — Gordon Rees Scully Mansukhani, LLP (57) ABSTRACT

It is provided a gas bag which is inflatable for the protection of a vehicle occupant, comprising: a first gas bag layer and a second gas bag layer, wherein a first fabric blank forms the first gas bag layer and a second fabric blank forms the second gas bag layer, wherein the first fabric blank and the second fabric blank each are woven from threads. The gas bag includes at least one elongate portion which extends along a longitudinal direction and which is formed by at least a part of the first gas bag layer and at least a part of the second gas bag layer.

20 Claims, 6 Drawing Sheets

(51) Int. Cl.
*B60R 21/207* (2006.01)
*B60R 21/16* (2006.01)

(52) U.S. Cl.
CPC ............. *B60R 2021/161* (2013.01); *B60R 2021/23146* (2013.01); *B60R 2021/23509* (2013.01); *B60R 2021/23571* (2013.01)

(58) Field of Classification Search
CPC .......... B60R 2021/23509; B60R 2021/23571; B60R 2021/161; B60R 2021/23542; B60R 2021/23547; D03D 1/02; D03D 13/002
See application file for complete search history.

(56) References Cited

U.S. PATENT DOCUMENTS

| | | | |
|---|---|---|---|
| 5,806,881 A * | 9/1998 | Richter | B60R 21/231 |
| | | | 280/730.2 |
| 5,884,574 A | 3/1999 | Sogi et al. | |
| 7,422,233 B2 * | 9/2008 | Bradburn | B60R 21/232 |
| | | | 280/730.2 |
| 7,458,606 B2 * | 12/2008 | Charpentier | B60R 21/232 |
| | | | 280/729 |
| 7,708,306 B2 * | 5/2010 | Yoshikawa | B60N 2/42763 |
| | | | 280/730.1 |
| 7,789,417 B2 * | 9/2010 | Yoshikawa | B60N 2/42763 |
| | | | 280/730.1 |
| 7,819,419 B2 | 10/2010 | Hayashi et al. | |
| 7,819,423 B2 * | 10/2010 | Loibl | B60R 21/207 |
| | | | 280/728.2 |
| 7,954,850 B2 | 6/2011 | Fischer et al. | |
| 8,419,059 B2 * | 4/2013 | Sager | B60R 21/2338 |
| | | | 280/742 |
| 8,448,984 B2 * | 5/2013 | Azuma | B60R 21/26 |
| | | | 280/730.2 |
| 8,573,637 B2 * | 11/2013 | Fink | B60R 21/232 |
| | | | 280/730.2 |
| 8,622,424 B2 * | 1/2014 | Finn | B60R 21/2338 |
| | | | 280/743.1 |
| 2002/0135173 A1 * | 9/2002 | Keshavaraj | B60R 21/233 |
| | | | 280/743.2 |
| 2005/0269808 A1 | 12/2005 | Song et al. | |
| 2008/0012271 A1 | 1/2008 | Gutmann et al. | |
| 2009/0146404 A1 * | 6/2009 | Furuno | B60R 21/231 |
| | | | 280/732 |
| 2009/0278338 A1 | 11/2009 | Takahiro et al. | |
| 2010/0116580 A1 | 5/2010 | Choi | |
| 2010/0207367 A1 | 8/2010 | Weyrich et al. | |
| 2012/0139215 A1 * | 6/2012 | Heuschmid | B60R 21/233 |
| | | | 280/730.2 |
| 2012/0235388 A1 | 9/2012 | Suzuki | |
| 2015/0014968 A1 | 1/2015 | Scott et al. | |

FOREIGN PATENT DOCUMENTS

| | | |
|---|---|---|
| CN | 101495345 B | 7/2009 |
| CN | 101734220 A | 6/2010 |
| CN | 101842271 A | 9/2010 |
| CN | 104276125 A | 1/2015 |
| DE | 40 38 287 A1 | 6/1991 |
| DE | 43 06 696 A1 | 9/1993 |
| DE | 44 05 927 A1 | 2/1995 |
| DE | 10 2006 028 933 A1 | 12/2007 |
| DE | 10 2008 027 036 A1 | 4/2009 |
| DE | 10 2010 062422 A1 | 5/2011 |
| DE | 10 2012 203 411 A1 | 9/2012 |
| EP | 0 454 213 B1 | 11/1991 |
| EP | 0 773 144 B1 | 3/2000 |
| EP | 0 988 185 B1 | 9/2001 |
| EP | 1 334 011 B1 | 6/2006 |
| EP | 1 519 858 B1 | 4/2007 |
| EP | 1 905 658 B1 | 5/2012 |
| EP | 2 117 882 B1 | 9/2012 |
| EP | 2 540 580 A1 | 1/2013 |
| EP | 2 219 907 B1 | 3/2013 |
| GB | 2 241 207 A | 8/1991 |
| JP | 5-238347 | 9/1993 |
| JP | 2013-123974 A | 6/2013 |
| WO | WO 96/05986 | 2/1996 |
| WO | 2006/007962 A1 | 1/2006 |

OTHER PUBLICATIONS

Chinese Office Action dated Jul. 31, 2019 issued in related Chinese Patent Application No. 201680031039.7; filed May 27, 2016.

* cited by examiner

GAS BAG FOR AN AIRBAG MODULE

CROSS-REFERENCE TO A RELATED APPLICATION

This application is a National Phase Patent Application of International Patent Application Number PCT/EP2016/062030, filed on May 27, 2016, which claims priority of German Patent Application Number 10 2015 108 423.6, filed on May 28, 2015.

BACKGROUND

The invention relates to a gas bag.

In the case of activation, a gas bag as part of an airbag module for a vehicle serves to slow down a vehicle occupant or a body part of the vehicle occupant. In the case of activation, the gas bag therefor is filled with gas by a gas generator, in order to provide a cushion-like protection for the vehicle occupant. For example, airbag modules are known which during a side impact of the vehicle serve to protect the head and thorax region of the vehicle occupant. In the properly arranged condition of such airbag module the gas-filled gas bag extends laterally beside the vehicle occupant in the case of activation. For a so-called far-side impact airbag modules are known, which are provided in the backrest of the vehicle seat on the side of the vehicle seat facing the vehicle center. In the case of activation, the gas-filled gas bag exits from the backrest on the side facing the vehicle center and slides between the vehicle occupant and the point of impact and in particular between the vehicle occupant and a possible adjacent vehicle occupant. For protection against a so-called near-side impact an airbag module with a gas bag is known, which in the case of activation extends like a curtain out of the ceiling of the vehicle body laterally beside the vehicle occupant.

To provide for a protection as efficient as possible, it is advantageous when the gas-filled gas bag is positioned relatively close to the head of the vehicle occupant. For this purpose, a gas bag chamber can be provided, which as compared to known gas bag chambers has a larger volume, so that in the case of activation it extends very close to the head of the vehicle occupant and can support the head and thorax region at an early stage. However, such gas bag would require more space than a known gas bag also in the folded condition. In addition, a comparatively larger gas generator is required, in order to be able to fill the large volume with gas. Consequently, the available installation space for the airbag module might be too small.

Another possibility of positioning the filled gas bag as close as possible to the head of the vehicle occupant consists in providing a gas bag which in the inflated condition is curved towards the vehicle occupant. For example, a curvature of the gas bag can be achieved by using additional catch straps attached to the gas bag layers of the gas bag, as is known for example from DE 44 05 927 A1. Alternatively, gathering seams in the gas bag layers can influence the shape of the gas bag in the inflated condition. This effect is utilized for example for the side airbag module known from EP 0 988 185 B1 and for the gas bag from EP 0 773 144 B1. Furthermore, a curvature of the inflated gas bag can be effected by using special blanks of the gas bag layers forming the gas bag. These measures however represent an additional expenditure in the development and manufacture of the gas bag.

SUMMARY

It is an object underlying the present invention to provide a gas bag which in the inflated condition has a desired curvature that can be realized with simple means.

According to the invention, this object is solved by a gas bag with features as described herein.

The gas bag which is inflatable for the protection of a vehicle occupant accordingly comprises a first gas bag layer and a second gas bag layer, wherein a first fabric blank forms the first gas bag layer and a second fabric blank forms the second gas bag layer, and wherein the first fabric blank and the second fabric blank each are woven from threads. The gas bag includes at least one elongate portion which extends along a longitudinal direction and which is formed at least by a part of the first gas bag layer and at least a part of the second gas bag layer. The gas bag is characterized in that in the rest condition of the gas bag the threads of the first gas bag layer and the threads of the second gas bag layer are oriented relative to each other such that the threads of the first gas bag layer include a different angle with the longitudinal direction of the elongate portion than the threads of the second gas bag layer, wherein the angles are chosen such that in the inflated condition the gas bag has a curvature in direction of one of the two gas bag layers.

In the case of activation, the fabric of the first and the second gas bag layer in the elongate portion is stressed more strongly in a direction transversely to the longitudinal direction of the elongate portion than along the longitudinal direction of the elongate portion due to the elongate shape of the portion. Since the threads of the two gas bag layers each include a different angle with the longitudinal direction of the elongate portion, the relative arrangement of the threads of the first gas bag layer and the relative arrangement of the threads of the second gas bag layer can change differently in the case of activation. For example, in the case of activation the one gas bag layer (for example the first gas bag layer) can stretch more strongly transversely to the longitudinal direction of the elongate portion and (due to stretching transversely to the longitudinal direction) can contract (compress) more strongly along the longitudinal direction of the elongate portion than the other gas bag layer (for example the second gas bag layer). This different stretching and compression behavior of the two gas bag layers leads to a curvature of the gas bag in the inflated condition in direction of one of the two gas bag layers.

Preferably, the curvature of the inflated gas bag is obtained at a gas bag internal pressure of more than 100 kPa.

By the gas bag according to claim 1 the desired positioning of the gas-filled gas bag also can be achieved without an increase of the gas bag volume and the disadvantages associated therewith.

According to one embodiment, the gas bag can include a first gas bag layer and a second gas bag layer, which each are connected with each other along their circumferential edge via a first connection. The first gas bag layer can be formed by a first fabric blank and the second gas bag layer can be formed by a second fabric blank. The first and the second fabric blank each can be cut out from a fabric which is woven from threads. In the rest condition of the gas bag, the threads of the first gas bag layer and the threads of the second gas bag layer can be oriented relative to each other such that the threads of the first gas bag layer and the first connection include a different angle than the threads of the second gas bag layer and the first connection. The angles can be chosen such that in the inflated condition the gas bag has a curvature in direction of one of the two gas bag layers.

In the case of activation, the fabric is stressed substantially vertically to the first connection. However, since the threads of the two gas bag layers each include a different angle with the direction of the tensile force, the threads of the first gas bag layer and the threads of the second gas bag layer are stressed differently, which leads to a different stretching behavior of the first and the second gas bag layer. The larger the angle between the threads of a gas bag layer and the direction of the tensile force, i.e. the less mechanical stress is effected along the direction of extension of these threads, the more the fabric of the material layer can stretch. Due to the different stretching behavior of the first and the second gas bag layer, a curvature of the inflated gas bag can be accomplished. Preferably, the curvature of the inflated gas bag is obtained at a gas bag internal pressure of more than 100 kPa.

It can be provided that in the mounted and inflated condition of the gas bag that gas bag layer (for example the first gas bag layer) faces the vehicle occupant which in the case of activation stretches more strongly transversely to the longitudinal direction of the elongate portion and contracts (is compressed) more strongly along the longitudinal axis of the elongate portion than the other gas bag layer (for example the second gas bag layer). Thus, a curvature of the inflated gas bag can be achieved, which is directed towards the vehicle occupant.

To achieve a curvature as strong as possible, in particular the threads of the second gas bag layer can extend substantially vertically or parallel to the longitudinal direction of the elongate portion and to the first connection, respectively. As a result, the angle included by the threads of the first gas bag layer and the longitudinal direction of the elongate portion or the first connection, and the angle included by the threads of the second gas bag layer and the longitudinal direction of the elongate portion or the first connection, can maximally differ from each other (namely by 45°). When the threads of the second gas bag layer do not extend substantially vertically or parallel to the longitudinal direction or the first connection, but include an angle with the longitudinal direction or the first connection, the angle included by the threads of the first gas bag layer and the longitudinal direction of the elongate portion or the first connection, and the angle included by the threads of the second gas bag layer and the longitudinal direction of the elongate portion or the first connection only can differ by less than 45°.

The gas bag can include exactly one or more than one elongate portion, wherein both the first gas bag layer and the second gas bag layer contribute to the formation of the elongate portion. In the inflated condition of the gas bag the at least one elongate portion can extend in a substantially tubular fashion. The elongate portion at least approximately extends along its longitudinal direction. It is conceivable, however, that the elongate portion does not extend exactly in a straight line (linearly), but at least sectionally deviates from such linear course (e.g. extends slightly curved). The elongate shape can lead to the fact that in the inflated condition the gas bag with the differently oriented fabrics of the gas bag layers as described above is curved in direction of the gas bag layer, in which the angle between the threads and the longitudinal direction of the elongate portion or of the first connection more strongly deviates from 90°.

Particularly preferably, the threads of the second gas bag layer extend substantially parallel or vertically to the longitudinal direction of the elongate portion. The achieved curvature comprises a component which is a deviation from the longitudinal direction of the elongate portion in direction of the first gas bag layer.

According to one embodiment, the gas bag in the inflated condition can include several elongate portions which are arranged substantially parallel to each other and/or lie on a common axis. Between at least two of the elongate portions a separating region can be disposed, which in the inflated condition of the gas bag has a smaller thickness than the elongate portions. Thickness of an elongate portion is understood to be the distance between the first gas bag layer and the second gas bag layer. The thickness of the separating region is the corresponding expansion of the separating region. For example, the separating region can be designed as non-inflatable region.

According to another embodiment, the gas bag in the inflated condition can include at least one first and at least one second elongate portion, wherein the second elongate portion extends along its longitudinal direction and substantially vertically to the longitudinal direction of the at least one first elongate portion. The at least one second elongate portion can at least be formed by a part of the first gas bag layer and at least a part of the second gas bag layer. By combining differently oriented elongate portions, a complex curvature of the inflated gas bag can be achieved. The first and the second elongate portion can be designed such that the inflated gas bag has a curvature about a first axis due to the first elongate portion and a curvature about a second axis due to the second elongate portion. The first and the second axis are aligned substantially vertically to each other (due to the vertical orientation of the first and the second elongate portion). Furthermore, the first axis is aligned substantially vertically to the longitudinal direction of the first elongate portion and substantially parallel to the longitudinal direction of the second elongate portion, while the second axis is aligned substantially vertically to the longitudinal direction of the second elongate portion and substantially parallel to the longitudinal direction of the first elongate portion.

Since the shape of the gas bag in the inflated condition can be controlled by the different orientation of the threads in the first and the second gas bag layer, complex fabric blanks which aim at an inclination of the inflated gas bag can be omitted. Rather, the first fabric blank and the second fabric blank each can be arranged two-dimensionally, i.e. each flat in one plane. Alternatively, however, there can also be used fabric blanks which are provided for a three-dimensional arrangement, in order to combine the effect of the differently oriented threads with that of the shape of the fabric blanks.

In case a fabric with a coating is used, the first and the second fabric blank can be formed mirror-symmetrical to each other. It can be achieved therewith that when connecting the two fabric blanks, the coating of both fabric blanks can be turned towards the gas bag interior space. The mirror-symmetrical formation does not refer to the orientation of the threads of the first and the second fabric blank relative to the respective circumferential edge.

It can furthermore be provided that the first fabric blank and the second fabric blank have the same shape and the same size. The first fabric blank and the second fabric blank also can be fabricated of the same fabric.

According to one embodiment, the first fabric blank and the second fabric blank each can be woven of warp threads and weft threads extending vertically to each other, wherein the type of the fabric of the first fabric blank and the type of the fabric of the second fabric blank are different such that on inflation of the gas bag the relative orientation of the warp threads and weft threads of the one (for example the first) fabric blank changes more strongly than the relative orientation of the warp threads and weft threads of the other (for example the second) fabric blank. In other words, the two gas bag layers have different shearabilities (movabilities of the warp and weft threads relative to each other), whereby the effect achieved by the different orientation of the gas bag layer fabric, that the one gas bag layer stretches more strongly on inflation of the gas bag transversely to the longitudinal direction of the elongate portion (and correspondingly is compressed more strongly in longitudinal direction of the elongate portion) is increased. It is also conceivable that a gas bag is provided whose gas bag layers have such different shearabilities, but the gas bag layers at least approximately are oriented equally.

To achieve a different degree of change of the relative orientation of the warp threads and weft threads in the two fabric blanks (i.e. the different shearabilities of the gas bag layer fabric), for example the threads of the first and the second fabric blank can have a different surface quality, in particular with regard to their smoothness (sliding property). There can also be provided a differently high weave density of the threads for the first fabric blank and the second fabric blank.

Furthermore, it can be provided that at least the fabric of the first fabric blank has a coating. The coating can be such that it impedes a change of the relative orientation of the warp threads and weft threads of the second fabric blank on inflation of the gas bag. Alternatively, the fabric of the first fabric blank and the fabric of the second fabric blank each can have a coating, wherein the coating of the first fabric blank impedes a change of the relative orientation of the warp threads and weft threads of the first fabric blank less than the coating of the second fabric blank impedes a change of the relative orientation of the warp threads and weft threads of the second fabric blank. The coatings can differ in terms of the layer thickness, the composition and/or elasticity. The coating can be formed flat on the fabric and/or individually enclose the threads.

Usually, a fabric is woven from warp threads and weft threads extending vertically to each other. The first fabric blank and the second fabric blank accordingly each comprise warp threads and weft threads. In particular, the warp threads and the weft threads are connected with each other (interwoven) such that during a rotation of the fabric (for example on inflation of the gas bag) in a direction which includes an angle greater than 0° and smaller than 90° with the warp threads or weft threads a compression of the fabric vertical to this direction occurs. The warp threads and weft threads originally extending vertically to each other are shifted such that they form a diamond pattern. In the gas bag, the warp threads and weft threads can be formed that when the fabric blanks are stressed, they have the same stretching behavior in direction both of the warp threads and of the weft threads.

According to another embodiment at least one bracing band can be provided, which intensifies a formation of the curvature of the gas bag in the inflated condition and/or stabilizes the curved shape of the inflated gas bag.

According to one embodiment, the first gas bag layer and the second gas bag layer each can be formed substantially rectangular, wherein the first gas bag layer and the second gas bag layer each are connected with each other along their circumferential edge by means of a first connection, and wherein the first gas bag layer and the second gas bag layer furthermore are connected with each other by a second and third connection each forming a closed curve. The second connection and the third connection can be arranged such with respect to the first connection that between the first gas bag layer and the second gas bag layer a substantially 8-shaped gas bag interior space is formed, which can be filled with gas. Furthermore, the second and the third connection each can define a non-inflatable region of the gas bag, which each separates two elongate portions of the gas bag from each other.

In the rest condition of the gas bag, the first gas bag layer and the second gas bag layer can rest against each other. In the inflated condition of the gas bag, the gas can be present between the first gas bag layer and the second gas bag layer or between a region of the first gas bag layer and a region of the second gas bag layer.

According to one embodiment it can be provided that the connections (for example connecting seams) are sealed with silicone, for example. The gas bag preferably has no outflow opening. It can thereby be achieved that a gas bag internal pressure of more than 100 kPa can be obtained. The curvature of the inflated gas bag (in particular of the sealed gas bag inflated with a high pressure) for example serves to support and stabilize the head of the vehicle occupant (in particular when using the gas bag as far-side gas bag).

According to one embodiment the gas bag, however, can also be formed such that in the inflated condition it can form a lateral impact protection for the protection of the head and thorax region of the vehicle occupant.

As mentioned, the gas bag can be designed as part of an airbag module which serves the protection against a far-side impact. It can be provided that the airbag module can be arranged such that the inflated gas bag can be deployed laterally beside the vehicle occupant. For example, the airbag module can be arranged on the backrest of a vehicle seat. According to one embodiment, the first gas bag layer can face the vehicle occupant and the second gas bag layer can face away from the vehicle occupant. Preferably, the at least one elongate portion is oriented substantially vertically or parallel to a B-pillar of a vehicle.

The curvature of the gas bag in the inflated condition therefore is directed towards the occupant and in the case of a far-side impact can support the occupant (in particular the head thereof) at an early stage and thus retain the occupant in the seat. The gas bag here has a supporting function.

BRIEF DESCRIPTION OF THE DRAWINGS

The invention will be explained in detail below by means of several exemplary embodiments with reference to the Figures.

DETAILED DESCRIPTION

Figure 1:
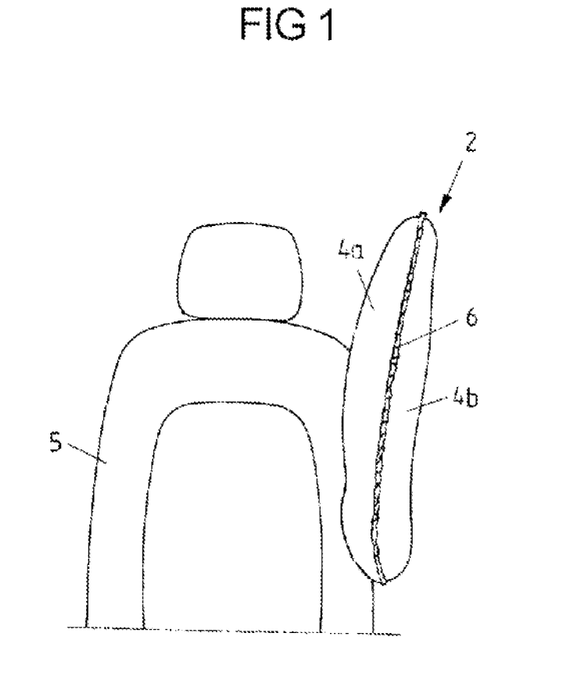
FIG. 1 shows a schematic representation of a gas bag in the inflated condition, which comprises two gas bag layers.

FIG. 1 shows a gas bag 2 in the inflated condition, which comprises a first gas bag layer 4a and a second gas bag layer 4b. The gas bag 2 for example can be used in an airbag module for protection against a far-side impact. In FIG. 1, the inflated gas bag 2 protrudes out of the backrest 5 of a vehicle seat in direction of travel.

Figure 2:
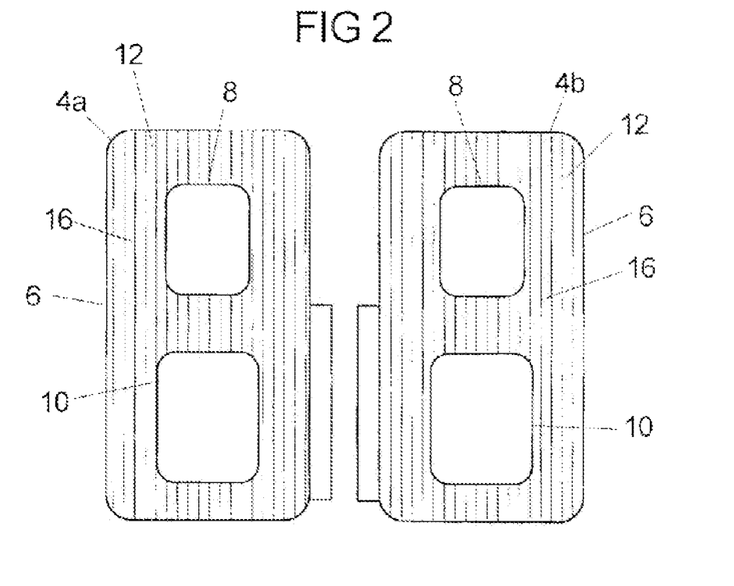
FIG. 2 shows a schematic top view of two fabric blanks for the formation of the two gas bag layers for the gas bag of FIG. 1.
Figure 3:
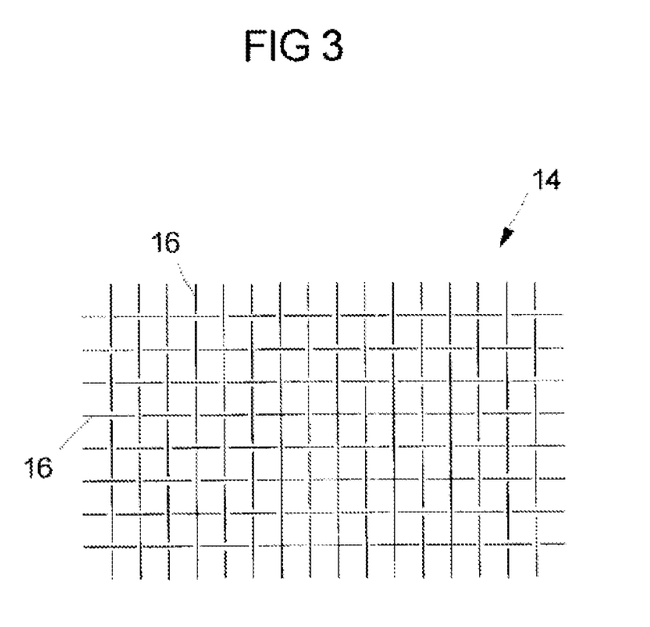
FIG. 3 shows a schematic top view of a fabric for a gas bag layer.

The first gas bag layer 4a and the second gas bag layer 4b are formed by a first fabric blank and a second fabric blank, respectively (FIG. 2). A fabric blank is cut out from a fabric 14 which is shown in FIG. 3 by way of example. A fabric suitable for gas bags for example comprises polyamide, in particular nylon 6.6 (also known as PA 6.6), or polyester. The fabric 14 comprises threads 16 which are interwoven. A distinction is made between so-called warp threads and weft threads, which are interwoven such that in the rest condition of the fabric the warp threads extend substantially at right angles with respect to the weft threads.

FIG. 2 shows the first gas bag layer 4a and the second gas bag layer 4b of the gas bag 2 of FIG. 1 spread out flat and separate from each other. In the fabric blanks of FIG. 2 only one type of threads 16 is depicted for clarity. The depicted threads 16 can either be the warp threads or the weft threads. The fabric blanks in FIG. 2 are formed substantially rectangular and each have the same shape and size. In the fabric blanks for the first gas bag layer 4a and the second gas bag layer 4b the threads 16 each are oriented equally. For example, the threads 16 each extend substantially parallel or vertically to the circumferential edge of the substantially rectangular fabric blanks.

For manufacturing the gas bag 2 the first gas bag layer 4a and the second gas bag layer 4b are connected via a first connection 6 which extends along the circumferential edge of the gas bag layers 4a, 4b. Furthermore, a second connection and a third connection are provided, whose courses in FIG. 2 are designated with the reference numerals 8 and 10. The second connection 8 and the third connection 10 each form a closed curve which substantially has the shape of a rectangle. The first, second and third connections 6, 8, 10 are arranged relative to each other such that they define an 8-shaped region. The (substantially rectangular) regions of the gas bag layers 4a, 4b enclosed by the second connection 8 and the third connection 10 are separated from the remaining substantially 8-shaped region 12 of the gas bag layers 4a, 4b such that primarily the 8-shaped region 12 can be filled with a gas. The connections 6, 8 and 10 for example can be a seam, a welding seam or an adhesive connection.

The first connection 6 extends along the rectangular circumferential edge of the fabric blanks. The second and third connections 8 and 10 each extending in a rectangularly closed form are oriented such that they sectionally extend parallel to the first connection 6. In general, the threads 16 of the first gas bag layer 4a and the second gas bag layer 4b of the gas bag 2 of FIG. 1 extend parallel or vertically to the first, second and third connections 6, 8 and 10, which hold the first gas bag layer 4a and the second gas bag layer 4b together. Due to the equal orientation of the threads 16 in the first gas bag layer 4a and the second gas bag layer 4b, the threads 16 of the first gas bag layer 4a and the second gas bag layer 4b are stressed equally by pressurization in the inflated gas bag 2, so that the first gas bag layer 4a and the second gas bag layer 4b are deformed substantially to the same extent.

Figure 4:
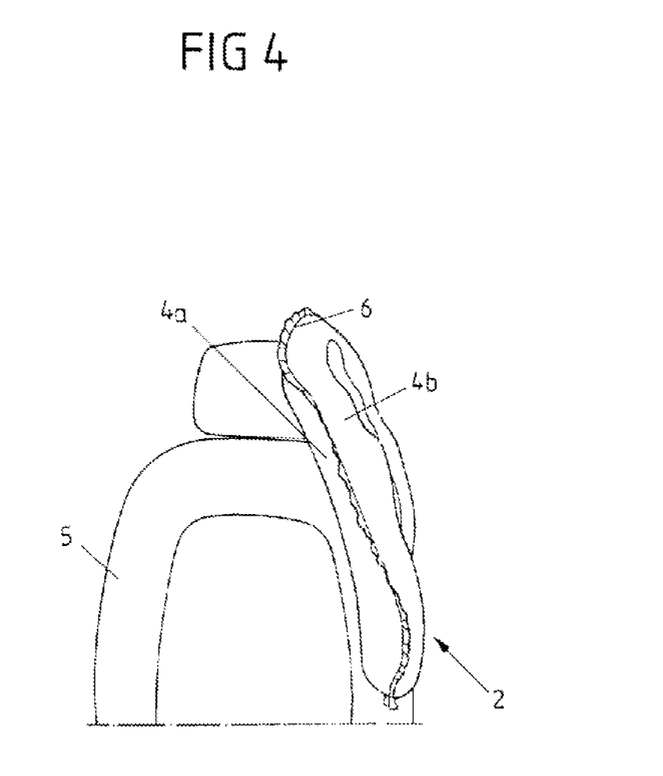
FIG. 4 shows a schematic representation of a gas bag according to one embodiment of the invention in the inflated condition, which comprises two gas bag layers.
Figure 5:
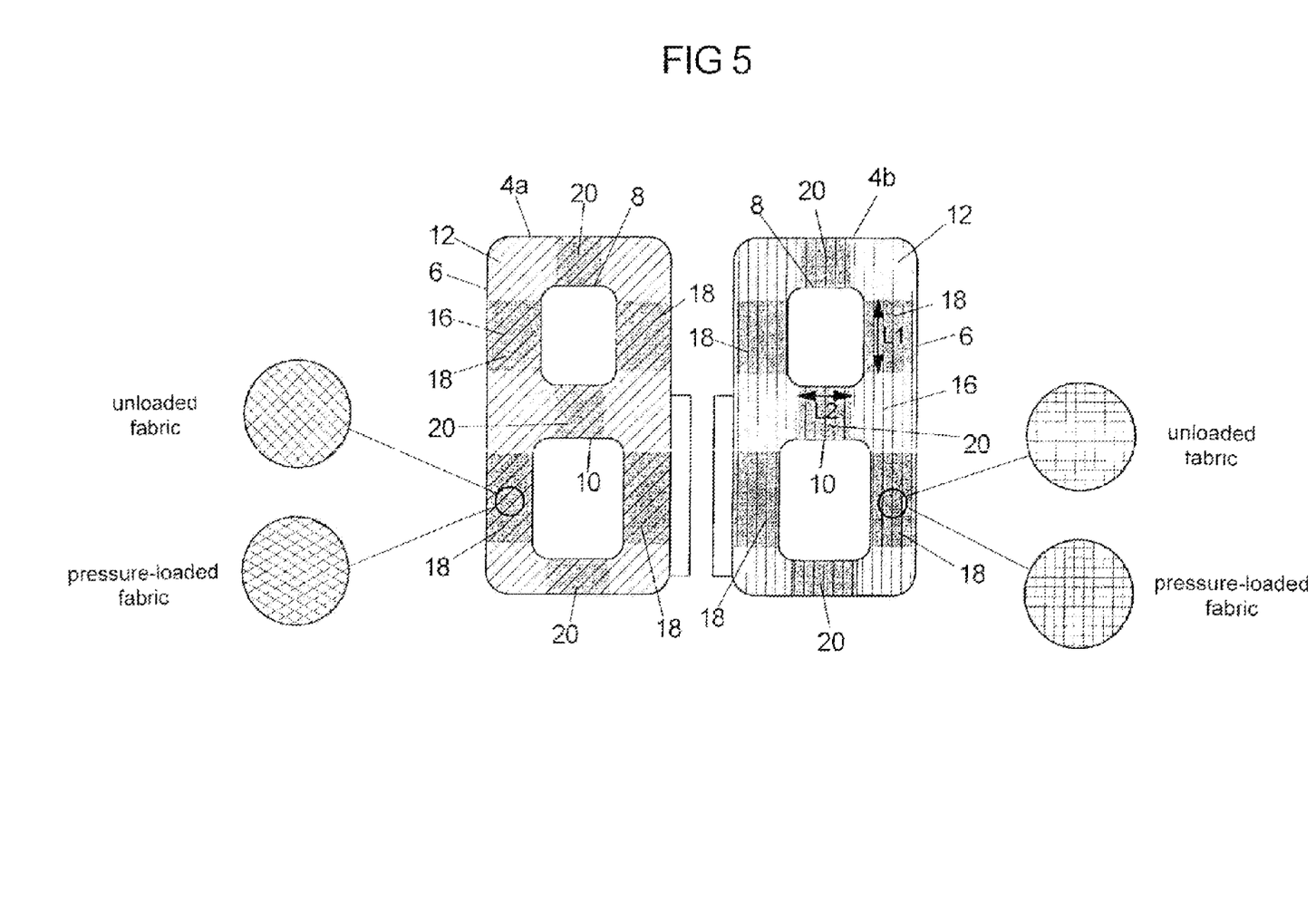
FIG. 5 shows a schematic top view of two fabric blanks for the formation of the two gas bag layers for the gas bag of FIG. 4.

A gas bag 2 according to the invention is shown in FIG. 4 in the inflated condition. This gas bag 2 comprises the first gas bag layer 4a and the second gas bag layer 4b as shown in FIG. 5. Shape, size and material of the gas bag layers 4a, 4b of FIG. 5 correspond to the shape, size and the material of the gas bag layers of FIG. 2. The gas bag layers of FIG. 5 are held together by first, second and third connections 6, 8 and 10, which correspond to the first, second and third connections 6, 8 and 10 described in connection with FIGS. 1 and 2.

The first and the second gas bag layer 4a, 4b of FIG. 5 each are formed of a substantially rectangular or second fabric blank. The two fabric blanks are identical in terms of shape and size. Furthermore, the two fabric blanks each can be arranged flat. Hence, these are two-dimensional fabric blanks. In the second gas bag layer 4b the threads 16 each are oriented parallel or vertically to the substantially rectangular circumferential edge of the second fabric blank. On the other hand, the threads 16 of the first gas bag layer 4a do not extend parallel or vertically to the circumferential edge of the first fabric blank. Rather, the threads 16 of the first gas bag layer 4a include an angle of 45° with the circumferential edge of the first fabric blank.

The first gas bag layer 4a can be cut out from the same fabric as the second gas bag layer 4b, wherein the fabric is aligned differently with respect to a template used for cutting out for the production of the first and the second fabric blank. When the first gas bag layer 4a and the second gas bag layer 4b each have a coating on the side facing the gas bag interior space, the fabric is aligned mirror-symmetrically with respect to a template used for cutting out for the production of the first and the second fabric blank.

In the condition of the gas bag layers 4a, 4b properly arranged relative to each other, the threads 16 of the first gas bag layer 4a and the threads 16 of the second gas bag layer 4b include an angle of 45°. After the first gas bag layer 4a and the second gas bag layer 4b have been connected with each other by means of the connections 6, 8 and 10, the threads 16 of the second gas bag layer 4b extend parallel or vertically to the connections 6, 8 and 10, and the threads 16 of the first gas bag layer 4a extend at an angle of 45° to these connections 6, 8 and 10.

Due to the different orientation of the threads 16 with respect to the connections 6, 8 and 10 in the first gas bag layer 4a and the second gas bag layer 4b, the first gas bag layer 4a and the second gas bag layer 4b have a different stretching behavior when the gas bag 2 is filled with a gas. The first gas bag layer 4a can be stretched more strongly in a direction transversely to a longitudinal direction L1 of elongate portions 18 of the gas bag 2 and is compressed more strongly than the second gas bag layer 4b in longitudinal direction L1 of the elongate portions 18, as will be explained below.

On inflation of the gas bag 2 tensile forces act on the fabric blanks substantially vertically between two portions of the connections 6, 8 and 10 facing each other (in parallel). The tensile forces thus act substantially along the threads 16 of the second gas bag layer 4b, so that the angle between the warp threads and the weft threads in the second gas bag layer 4b changes only insignificantly on inflation of the gas bag 2 (FIG. 5). The extent of stretching hence primarily depends on the elasticity of the threads 16 as such. In general, the stretching of the second gas bag layer 4b is rather small on pressurization. On the other hand, the tensile forces in the first gas bag layer 4a act at an angle of 45° to the threads 16, so that due to the pressurization the orientation of the warp threads and weft threads relative to each other is noticeably changed. On pressurization, the warp threads and weft threads in the first gas bag layer 4a, which in the rest condition are arranged at right angles to each other, form a diamond shape (FIG. 5). This leads to stretching of the fabric of the first gas bag layer 4a in a first direction and to the compression of the fabric in a second direction which is orthogonal to the first direction. The extent of stretchability of the first gas bag layer 4a primarily depends on the change in direction of the threads 16 on inflation of the gas bag 2, and the elasticity of the threads 16 as such only plays a subordinate role.

The compression of the fabric of the first gas bag layer 4a is important for the formation of a curvature of the inflated gas bag 2. To direct the curvature in a desired direction, the geometry of the inflated gas bag must be chosen specifically. In the inflated condition, the gas bag 2 according to the invention as shown in FIG. 4 includes a plurality of elongate, in particular tubular portions 18, 20, which are defined by the first, second and third connections 6, 8 and 10. In FIG. 5, the portions of the gas bag layers 4a, 4b, which in the inflated condition form the tubular portions 18, 20, are highlighted in grey. There are four first (vertical) tubular portions 18 and three second (horizontal) tubular portions 20. The terms vertical and horizontal relate to the orientation in FIG. 5 and to the condition properly installed on a vehicle seat, as it is shown in FIG. 4. In FIG. 4, the backrest 5 of the vehicle seat is aligned substantially vertically.

The vertical tubular portions 18 extend along their longitudinal direction L1, wherein their length along the longitudinal direction L1 can be greater than their width transversely to the longitudinal direction L1. Correspondingly, the horizontal tubular portions 20 extend along their longitudinal direction L2, wherein their length along the longitudinal direction L2 can be greater than their width transversely to the longitudinal direction L2.

Figure 6:
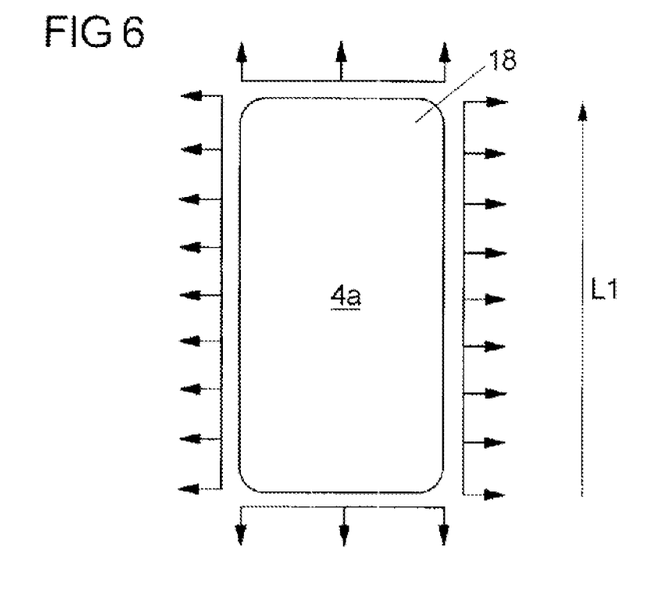
FIG. 6 shows a schematic representation of the forces which in the inflated condition act on the fabric in a tubular portion of the gas bag of FIG. 4.

FIG. 6 by way of example shows a vertical tubular portion 18 with a top view of the first gas bag layer 4a. The arrows in FIG. 6 indicate the tensile forces which act on the fabric. Since the vertical tubular portion 18 is longer than wide, a greater force in absolute terms acts in direction of the width (transversely to L1) than in direction of the length (along L1). Thus, when the fabric is pressurized, the warp threads and weft threads are aligned such that they form a diamond pattern, wherein the fabric is stretched in direction of the width of the vertical tubular portion 18 (transversely to the longitudinal direction L1) and is compressed in direction of the length of the vertical tubular portion 18 (along the longitudinal direction L1). The tubular portion 18 then is shortened.

Figure 7:
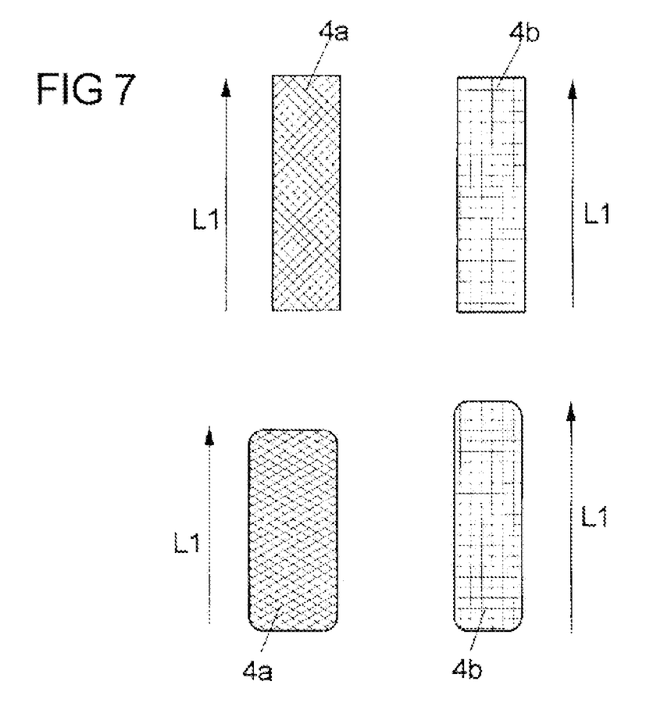
FIG. 7 shows a schematic top view of the two fabric blanks of FIG. 5 in the region of a tubular portion in the non-inflated condition (above) and in the inflated condition (below).

The gas bag layers 4a, 4b of the vertical tubular portion 18 of FIG. 6 are shown separately in FIG. 7. In the upper part of FIG. 7 the gas bag layers 4a, 4b are schematically shown in the non-inflated condition of the gas bag and in the lower part of FIG. 7 the gas bag layers 4a, 4b are shown in the inflated condition of the gas bag. While second gas bag layer 4b hardly changes as regards its expansion along and transversely to L1 due to the pressurization, the first gas bag layer 4a stretches transversely to the longitudinal direction L1 and is shortened correspondingly along the longitudinal direction L1. The different behavior of the two gas bag layers 4a, 4b of the tubular portion contributes to a curvature of the inflated gas bag in direction of the first gas bag layer 4a, wherein the curvature is a deviation from the longitudinal direction L1 of the tubular portion.

Correspondingly, each horizontal tubular portion 20 also is deformed upon pressurization: the fabric (of the first gas bag layer 4a) is stretched in direction of the width of the horizontal tubular portion 20 (transversely to the longitudinal direction L2) and is compressed in direction of the length of the horizontal tubular portion 20 (along the longitudinal direction L2), when the horizontal tubular portion 20 is longer than wide.

The extent of stretching and compression can be influenced by suitably choosing the length and the width of a tubular portion 18, 20. When the tubular portion 18, 20 is cylindrical in the inflated condition of the gas bag 2, the length L of the cylinder preferably is to be chosen such that it corresponds to the inequality L≥π·r, wherein r is the radius or distance of the outer cylinder surface from the central axis of rotation. The inflated cylinder has a circumference U, which is calculated according to the equation U=2·π·r. To be able to provide a cylinder with the circumference U in the inflated condition, the width of the portions of the two gas bag layers 4a, 4b, which contribute to the formation of the cylinder, can be chosen such that they each correspond to half the circumference U. Assuming that the width b of each gas bag layer satisfies the equation b=U/2, the inequality L≥π·r, which applies for the inflated condition, can be expressed in the form transferred to the non-inflated condition L≥b.

The effect of compression/stretching adds up for the four vertical tubular portions 18 and adds up for the three horizontal tubular portions 20 in the first gas bag layer 4a, while this effect does not occur in the second gas bag layer 4b. The effect of the vertical tubular portions 18 is superimposed with the effect of the horizontal tubular portions 20. Shortening or compression of the tubular portions 18, 20 on the side of the first gas bag layer 4a in combination with the second gas bag layer 4b leads to a curvature of the inflated gas bag 2 in direction of the first gas bag layer 4a. The vertical tubular portions 18 primarily contribute to a deviation from an axis which is parallel to the longitudinal direction L1, and the horizontal tubular portions 20 contribute to a deviation from an axis which is parallel to the longitudinal direction L2. The effect of the vertical tubular portions 18 and the effect of the horizontal tubular portions 20 are superimposed such that all in all a shell-like curvature is produced. When the gas bag 2 in the inflated condition is deployed laterally beside the vehicle occupant, wherein the first gas bag layer 4a faces the vehicle occupant and the second gas bag layer 4b faces away from the vehicle occupant, the gas bag 2 thus in general can offer a lateral impact protection and in particular also an impact protection in or against the direction of travel (along the longitudinal direction L2).

By choosing the number, orientation and shape of the tubular portions 18, 20 the geometry of the inflated gas bag can selectively be influenced. The number of the vertical tubular portions 18 and of the horizontal tubular portions 20 is variable. Furthermore, it is conceivable that the gas bag 2 includes only one tubular portion. When the length (along the longitudinal direction) is greater than the width (transversely to the longitudinal direction), the first gas bag layer 4a will be shortened along the longitudinal direction of the tubular portion, while the second gas bag layer remains almost unchanged. As a result, a curvature of the inflated gas bag 2 will be obtained in direction of the first gas bag layer 4a, wherein the curvature is a deviation from the longitudinal direction of the tubular portion. Alternatively, several tubular portions can be provided, which are exclusively (substantially) parallel to each other or lie on a common axis. Furthermore, several tubular portions can be provided, which are aligned orthogonally to each other, wherein the tubular portions do not necessarily extend vertically and horizontally. The terms "vertical" and "horizontal" here likewise relate to the orientation shown in FIG. 5 and the condition properly installed on a vehicle seat, as it is shown in FIG. 4, wherein "vertical" relates to the longitudinal direction L1 and "horizontal" relates to a direction L2 transverse thereto.

Figure 8:
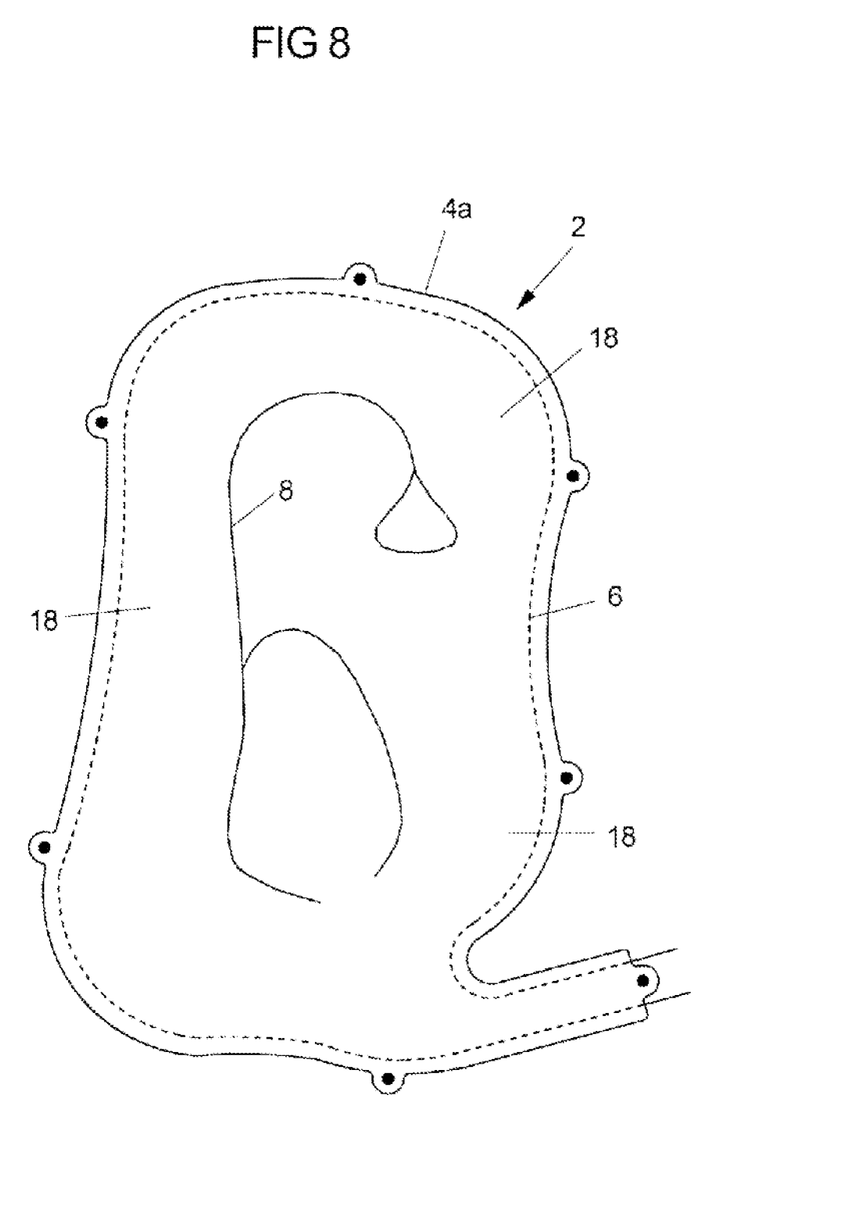
FIG. 8 shows a schematic top view of a fabric blank of a gas bag according to another exemplary embodiment of the invention.

Moreover, the tubular portions need not necessarily be distributed symmetrically (as for example in FIG. 5). Rather, the tubular portions can be distributed arbitrarily depending on the desired shape of the inflated gas bag, wherein they can also differ in terms of size and/or shape (e.g. linear or slightly curved). An example for such gas bag is shown in FIG. 8. According to FIG. 8, a continuous tubular portion 18 extends on the one side (the left side in FIG. 8) and two spaced tubular portions 18 extend on the other (right) side of the gas bag 2. The total length of the right tubular portions 18 is smaller than the length of the left tubular portion 18, so that the left side of the gas bag 2 will be curved more strongly than the right side.

In the exemplary embodiment shown in the Figures the elongate or tubular portions 18, 20 have a round cross-section. However, other shapes are conceivable, which differ from a circular shape. For example, a tubular portion can also be oval in cross-section.

In the gas bag according to the invention (FIGS. 4 to 8) the threads 16 of the first gas bag layer 4*a* and the threads of the second gas bag layer 4*b* include an angle of 45°, wherein the threads 16 of the second gas bag layer 4*b* extend vertically between the connections 6, 8 and 10, i.e. in direction of the tensile forces. In this configuration, the difference in the stretching behavior (transversely to the longitudinal direction of the elongate/tubular portions 18, 20) or in the compression behavior (along the longitudinal direction of the elongate/tubular portions 18, 20) of the two gas bag layers 4*a*, 4*b* is greatest. To reduce the extent of the curvature, the angle therefore can be varied and assume a value between 0° and 45°. To achieve a curvature of the inflated gas bag, the angle included by the threads 16 of the first gas bag layer 4*a* and of the second gas bag layer 4*b*, respectively, with the connections 6, 8 and 10 also must be taken into account beside the angle which the threads 16 of the first gas bag layer 4*a* and the threads 16 of the second gas bag layer 4*b* include with each other. The stretching behavior of the first gas bag layer 4*a* and of the second gas bag layer 4*b* for example is identical, when the threads 16 of the first gas bag layer 4*a* and the threads of the second gas bag layer 4*b* include an angle >0° with each other, but the threads 16 of the first gas bag layer 4*a* include the same angle with the connections 6, 8, 10 as the threads 16 of the second gas bag layer 4*b* with the connections 6, 8, 10. To bring about a different stretching behavior care should therefore be taken that the angle which the threads 16 of the first gas bag layer 4*a* include with the connections 6, 8, 10 differs from the angle which the threads 16 of the second gas bag layer 4*b* include with the connections 6, 8, 10.

To achieve early catching of a vehicle occupant in the case of a lateral impact, an airbag module comprising the gas bag 2 according to the invention can be arranged such (for example at the backrest of the vehicle seat) that the first gas bag layer 4 of the inflated gas bag 2 faces the vehicle occupant in the case of activation and the second gas bag layer 4*b* faces away from the vehicle occupant (FIG. 4). In the case of activation, the inflated gas bag 2 thus is curved towards the vehicle occupant.

In the Figures, the gas bag 2 according to the invention is shown in connection with an airbag module for protection against a far-side impact, which is integrated in the backrest 5 of the vehicle seat. It is also conceivable, however, that the gas bag 2 according to the invention is used in an airbag module for protection against a near-side impact with a curtain-like gas bag, which for example is arranged in the upper region of the vehicle body.

The invention claimed is:

1. A gas bag which is inflatable for the protection of a vehicle occupant, comprising:
   a first gas bag layer and a second gas bag layer,
   wherein a first fabric blank forms the first gas bag layer and a second fabric blank forms the second gas bag layer,
   wherein the first fabric blank and the second fabric blank each are woven from threads,
   wherein the gas bag includes at least one elongate portion which extends along a longitudinal direction and which is formed at least by a part of the first gas bag layer and at least a part of the second gas bag layer,
   wherein in the rest condition of the gas bag the threads of the first gas bag layer and the threads of the second gas bag layer are oriented relative to each other such that the threads of the first gas bag layer include a different angle with the longitudinal direction of the elongate portion than the threads of the second gas bag layer, and
   wherein the angles are chosen such that in the inflated condition the gas bag has a curvature in direction of one of the two gas bag layers.

2. The gas bag according to claim 1, wherein the first and the second gas bag layer each are connected with each other along their circumferential edge by means of a first connection, wherein the threads of the first gas bag layer include a different angle with the first connection than the threads of the second gas bag layer.

3. The gas bag according to claim 1, wherein the threads of the first and the second gas bag layer are oriented relative to the longitudinal direction of the elongate portion such that on inflation of the gas bag the first gas bag layer contracts along the longitudinal direction of the elongate portion and stretches vertically to the longitudinal direction of the elongate portion as compared to the second gas bag layer.

4. The gas bag according to claim 1, wherein the threads of the second gas bag layer extend substantially vertically or parallel to the longitudinal axis of the elongate portion.

5. The gas bag according to claim 1, wherein the curvature comprises a deviation from the longitudinal direction in direction of the first gas bag layer.

6. The gas bag according to claim 1, wherein in the inflated condition the gas bag includes several elongate portions which at least approximately are arranged parallel to each other or lie on a common axis.

7. The gas bag according to claim 6, wherein between at least two of the elongate portions a separating region is disposed, which in the inflated condition has a smaller thickness than the elongate portions.

8. The gas bag according to claim 7, the separating region is designed as non-inflatable region.

9. The gas bag according to claim 1, wherein in the inflated condition the gas bag includes at least one first and at least one second elongate portion, wherein the second elongate portion extends along its longitudinal direction and substantially vertically to the longitudinal direction of the at least one first elongate portion and which is formed by at least a part of the first gas bag layer and at least a part of the second gas bag layer.

10. The gas bag according to claim 9, wherein the first and the second elongate portion are designed such that the inflated gas bag has a curvature about a first axis due to the first elongate portion and a curvature about a second axis due to the second elongate portion.

11. The gas bag according to claim 1, wherein the first fabric blank and the second fabric blank comprise the same fabric and in particular are fabricated from the same fabric.

12. The gas bag according to claim 1, wherein the first fabric blank and the second fabric blank each are woven from warp threads and weft threads extending vertically to each other, wherein the fabric of the first fabric blank and the fabric of the second fabric blank are formed differently such that on inflation of the gas bag the relative orientation of the warp threads and weft threads of the first fabric blank changes more strongly than the relative orientation of the warp threads and weft threads of the second fabric blank.

13. The gas bag according to claim 1, wherein at least the fabric of the first fabric blank has a coating.

14. The gas bag according to claim 13, wherein the fabric of the first fabric blank and the fabric of the second fabric blank each include warp threads and weft threads extending vertically to each other and a coating, wherein the coating of the first fabric blank impedes a change of the relative orientation of the warp threads and weft threads of the first fabric blank less than the coating of the second fabric blank impedes a change of the relative orientation of the warp threads and weft threads of the second fabric blank.

15. The gas bag according to claim 1, wherein the first fabric blank and the second fabric blank each are woven from warp threads and weft threads extending vertically to each other, which on stressing of the fabric blanks in direction of the warp threads or weft threads have the same stretching behavior.

16. The gas bag according to claim 1, wherein at least one bracing band is provided, which intensifies a formation of the curvature of the gas bag in the inflated condition.

17. An airbag module comprises a gas bag, which is inflatable for the protection of a vehicle occupant, and a gas generator for introducing a gas into the gas bag, wherein the gas bag is a gas bag according to claim 1.

18. The airbag module according to claim 17, wherein the airbag module can be arranged on a backrest of a vehicle seat such that in the inflated condition the gas bag can be deployed laterally beside the vehicle occupant.

19. The airbag module according to claim 18, wherein in the properly arranged condition of the airbag module and in the inflated condition of the gas bag the at least one first elongate portion is oriented substantially vertically or parallel to a B-pillar of a vehicle.

20. The airbag module according to claim 17, wherein in the inflated condition the first gas bag layer faces the vehicle occupant and the second gas bag layer faces away from the vehicle occupant.

* * * * *